(12) United States Patent
Diaz et al.

(10) Patent No.: US 11,465,803 B2
(45) Date of Patent: Oct. 11, 2022

(54) BIN RISER

(71) Applicant: Signode Industrial Group LLC, Glenview, IL (US)

(72) Inventors: Joseph Anthony Diaz, El Dorado Hills, CA (US); Jane Angelica Diaz, El Dorado Hills, CA (US); Robert C. Henry, Victory, MN (US)

(73) Assignee: Signode Industrial Group LLC, Tampa, FL (US)

( * ) Notice: Subject to any disclaimer, the term of this patent is extended or adjusted under 35 U.S.C. 154(b) by 211 days.

(21) Appl. No.: 17/015,236

(22) Filed: Sep. 9, 2020

(65) Prior Publication Data

US 2020/0399016 A1 Dec. 24, 2020

Related U.S. Application Data

(63) Continuation of application No. 16/278,994, filed on Feb. 19, 2019, now abandoned.

(60) Provisional application No. 62/635,031, filed on Feb. 26, 2018.

(51) Int. Cl.
| | |
|---|---|
| *B65D 19/44* | (2006.01) |
| *B65G 61/00* | (2006.01) |
| *B65D 19/00* | (2006.01) |
| *B65D 19/38* | (2006.01) |
| *B61D 45/00* | (2006.01) |
| *B65G 57/00* | (2006.01) |

(52) U.S. Cl.
CPC ............. *B65D 19/44* (2013.01); *B61D 45/00* (2013.01); *B65D 19/0012* (2013.01); *B65D 19/385* (2013.01); *B65G 57/005* (2013.01); *B65D 2519/00019* (2013.01); *B65D 2519/00054* (2013.01); *B65D 2519/00089* (2013.01); *B65D 2519/00368* (2013.01); *B65D 2519/00562* (2013.01); *B65D 2519/00815* (2013.01); *B65D 2519/00965* (2013.01)

(58) Field of Classification Search
CPC ...... B65G 61/00; B65G 67/20; B65G 57/005; B65D 19/44; B65D 19/0012; B65D 19/385; B61D 45/00; Y10S 414/106; Y10S 414/108; Y10S 414/107
USPC ........ 414/414, 799, 801, 927–929; 108/51.3, 108/53.1, 53.3, 53.5
See application file for complete search history.

(56) References Cited

U.S. PATENT DOCUMENTS

| | | | |
|---|---|---|---|
| 2,576,715 | A | 11/1951 | Farrell |
| 2,584,762 | A | 2/1952 | Vossenberg |
| 2,611,569 | A | 9/1952 | Coleman et al. |
| 2,894,671 | A | 7/1959 | Nicholls |
| 2,902,199 | A | 9/1959 | Paul |
| 2,903,218 | A | 9/1959 | Altenburg |
| 3,026,078 | A | 3/1962 | Daniel |
| 3,275,131 | A | 9/1966 | Erickson |
| 3,344,917 | A | 10/1967 | Michel |
| 3,583,579 | A * | 6/1971 | Triggs .................. B65G 57/302 414/413 |
| 3,589,309 | A | 6/1971 | Clark |

(Continued)

*Primary Examiner* — Gregory W Adams
(74) *Attorney, Agent, or Firm* — Neal, Gerber & Eisenberg LLP

(57) ABSTRACT

Various embodiments of the present disclosure provide a bin riser positionable between different types of shipping bins to enable these shipping bins to stably stack atop one another in a way that inhibits an adjacent stack of shipping bins from toppling over during transit.

20 Claims, 13 Drawing Sheets

(56) References Cited

U.S. PATENT DOCUMENTS

| | | | |
|---|---|---|---|
| 3,666,165 A | 5/1972 | Osborne et al. | |
| 3,730,417 A | 5/1973 | De | |
| 3,860,130 A * | 1/1975 | Frangos | E04H 6/187 |
| | | | 414/237 |
| 4,234,279 A * | 11/1980 | Lotti | B65G 65/23 |
| | | | 414/413 |
| 4,424,753 A | 1/1984 | Eatherton | |
| 4,480,748 A * | 11/1984 | Wind | B65D 71/0096 |
| | | | 108/55.3 |
| 4,807,748 A * | 2/1989 | Manning | B65D 19/00 |
| | | | 206/599 |
| 4,972,782 A | 11/1990 | Shepherd et al. | |
| 5,291,837 A | 3/1994 | Adams | |
| 5,452,667 A | 9/1995 | Lim | |
| 5,465,672 A | 11/1995 | Boyse et al. | |
| 5,597,282 A * | 1/1997 | Hoffman | B60P 1/4421 |
| | | | 414/812 |
| 5,598,787 A | 2/1997 | Pronk | |
| 5,603,258 A | 2/1997 | Besaw | |
| 5,672,412 A | 9/1997 | Phares et al. | |
| 5,676,064 A | 10/1997 | Shuert | |
| 5,769,003 A * | 6/1998 | Rose | B65D 19/004 |
| | | | 108/51.11 |
| 5,921,188 A | 7/1999 | Kohlhaas | |
| 6,354,229 B1 | 3/2002 | Heidtke | |
| 6,612,247 B1 | 9/2003 | Pistner et al. | |
| 6,842,665 B2 * | 1/2005 | Karlen | B65G 1/0478 |
| | | | 108/51.11 |
| 7,714,708 B2 * | 5/2010 | Brackmann | B60P 3/14 |
| | | | 180/290 |
| 8,397,916 B1 | 3/2013 | Cassidy et al. | |
| 9,371,179 B2 | 6/2016 | Miller et al. | |
| 9,932,144 B2 | 4/2018 | Embleton et al. | |
| 2013/0139734 A1* | 6/2013 | Scanzillo | B65D 19/004 |
| | | | 108/53.3 |
| 2013/0186309 A1 | 7/2013 | Niu | |
| 2013/0327680 A1 | 12/2013 | Reynolds et al. | |
| 2015/0210426 A1 | 7/2015 | Funaki | |

* cited by examiner

BIN RISER

PRIORITY

This application is a continuation of, and claims priority to and the benefit of, U.S. patent application Ser. No. 16/278,994, which was filed on Feb. 19, 2019, which claims priority to and the benefit of U.S. Provisional Patent Application No. 62/635,031, which was filed on Feb. 26, 2018, the entire contents of each of which are incorporated herein by reference.

FIELD

The present disclosure relates to a bin riser for separating vertically stacked shipping bins.

BACKGROUND

Shipping bins are used to ship materials and products. Typically, the materials and products are sealed inside the shipping bins, which are then loaded into a shipping container for transport. The shipping bins are often vertically stacked one atop the other in the shipping container.

In certain instances, shipping bins vertically stacked in this way can topple over during transit, as generally illustrated in FIG. 1. FIG. 1 illustrates a freight railroad car 10 having in interior compartment 12 and a side door 14. FIG. 1 illustrates four sets of vertically stacked shipping bins in the interior compartment 12 of the freight railroad car 10. These include: (1) stacked shipping bins 20, 22, and 24; (2) stacked shipping bins 30 and 32; (3) stacked shipping bins 40 and 42; and (4) stacked shipping bins 50, 52, and 54. Each of these shipping bins is positioned on a conventional wood pallet (not shown in detail). When these shipping bins are loaded in the interior compartment 12 of the freight railroad car 10: (1) the bottom ends of shipping bins 20, 30, 40, and 50 are at a same height (relative to the railroad car interior compartment floor); (2) the top ends of shipping bins 20, 30, 40, and 50 are at a same second height (relative to the railroad car interior compartment floor); (3) the bottom ends of shipping bins 22, 32, 42, and 52 are at a same third height (relative to the railroad car interior compartment floor); (4) the top ends of shipping bins 22, 32, 42, and 52 are at a same fourth height (relative to the railroad car interior compartment floor); (5) the bottom ends of shipping bins 24 and 54 are at a same fifth height (relative to the railroad car interior compartment floor); and (6) the top ends of shipping bins 24 and 54 are at a same sixth height (relative to the railroad car interior compartment floor). If shipping bin 24 has moved in transit, shipping bin 24 can topple over onto shipping bin 32 (as indicated in FIG. 1). If the shipping bin 24 has toppled over onto shipping bin 32 (as indicated in FIG. 1), when the side door 14 is opened, the shipping bin 24 can also fall out of the freight railroad car 10. Likewise, if shipping bin 54 has moved in transit, shipping bin 54 can topple over onto shipping bin 42. If the shipping bin 54 has toppled over onto shipping bin 42, when the side door 14 is opened, the shipping bin 54 can also fall out of the freight railroad car 10.

This issue is further complicated because shipping bins of different types (but of substantially the same height) are often used together. These different types of shipping bins often have different top ends. For instance, certain plastic shipping bins have upwardly extending lid clips and certain wood shipping bins do not have these upwardly extending lid clips. Conventional wood pallets cannot be used to properly stack these plastic shipping bins with upwardly extending lid clips because the lid clips prevent the wood pallets from squarely resting on the top ends of the plastic shipping bins.

SUMMARY

Various embodiments of the present disclosure provide a bin riser positionable between different types of shipping bins to enable these shipping bins to stably stack atop one another in a way that inhibits an adjacent stack of shipping bins from toppling over during transit.

Various example embodiments of the present disclosure provide a bin riser including a first deck, a second deck, and a spacer assembly connected to and extending between the first and second decks. The spacer assembly includes a first spacer spaced apart from a first side edge of the first deck and partially defining a first stacking guide receipt area of the first deck. The spacer assembly also includes a second spacer spaced apart from a second side edge of the first deck and partially defining a second stacking guide receipt area of the first deck.

Various example embodiments of the preset disclosure also provide a method of stacking shipping bins that includes positioning a first shipping bin at a designated location, a top end of the first shipping container including an upwardly extending stacking guide, positioning a bin riser on the top end of the first shipping bin such that part of a stacking guide receipt area of a first deck of the bin riser engages the upwardly extending stacking guide of the first shipping bin and partially deforms, and positioning a second shipping bin on a second deck of the bin riser.

DETAILED DESCRIPTION

Figure 1:
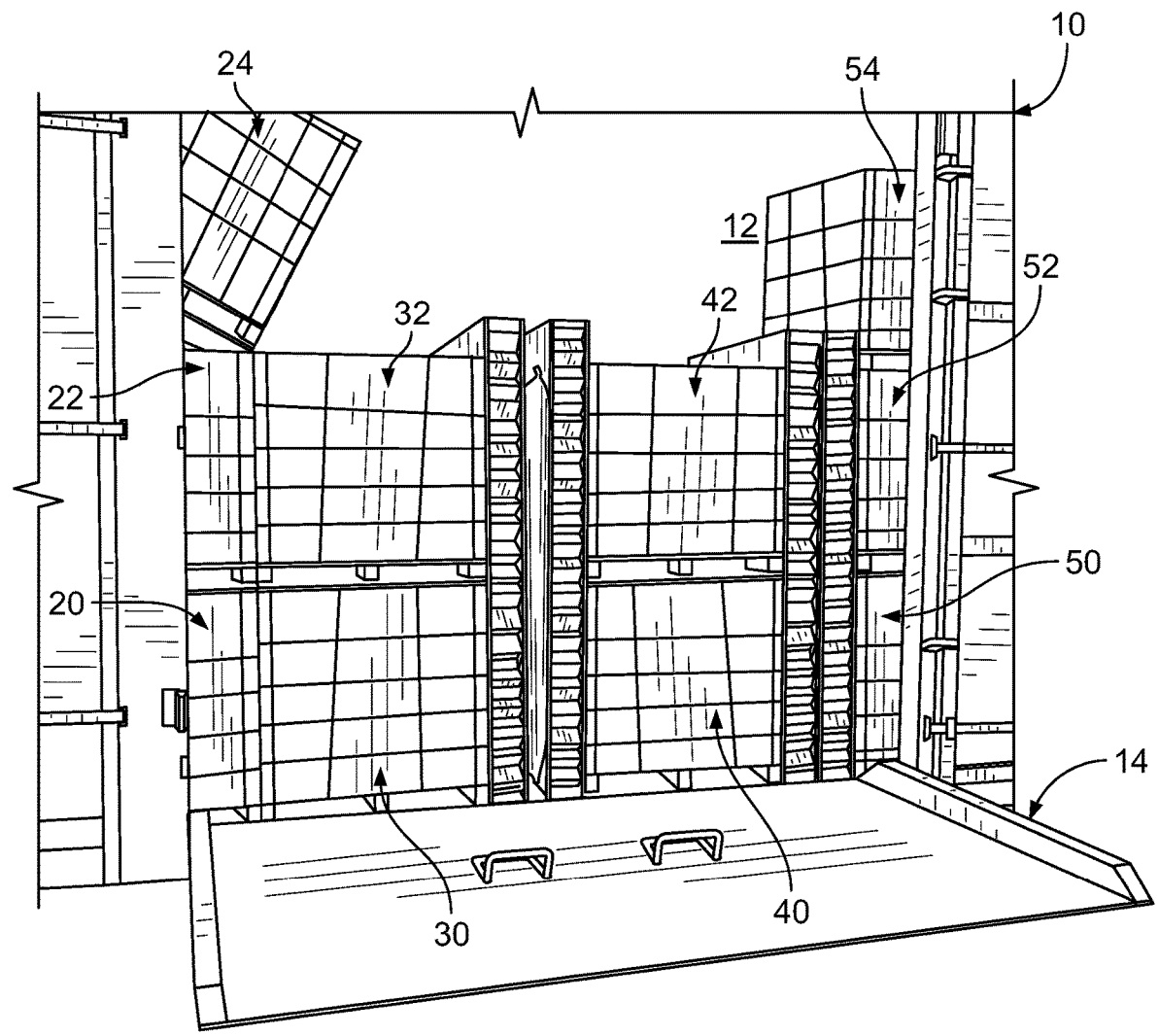
FIG. 1 is a fragmentary side perspective view of a freight railroad car with its side door opened and with four sets of stacked shipping bins positioned in the interior compartment of the freight railroad car, and showing one of the stacked shipping bins toppling over.

While the features, devices, and apparatus described herein may be embodied in various forms, the drawings show and the specification describe certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as coupled, mounted, connected, and the like, are not intended to be limited to direct mounting methods but should be interpreted broadly to include indirect and operably coupled, mounted, connected and like mounting methods. This specification is intended to be taken as a whole and interpreted in accordance with the principles of the present disclosure and as understood by one of ordinary skill in the art.

Example Bin Riser

Figure 8:
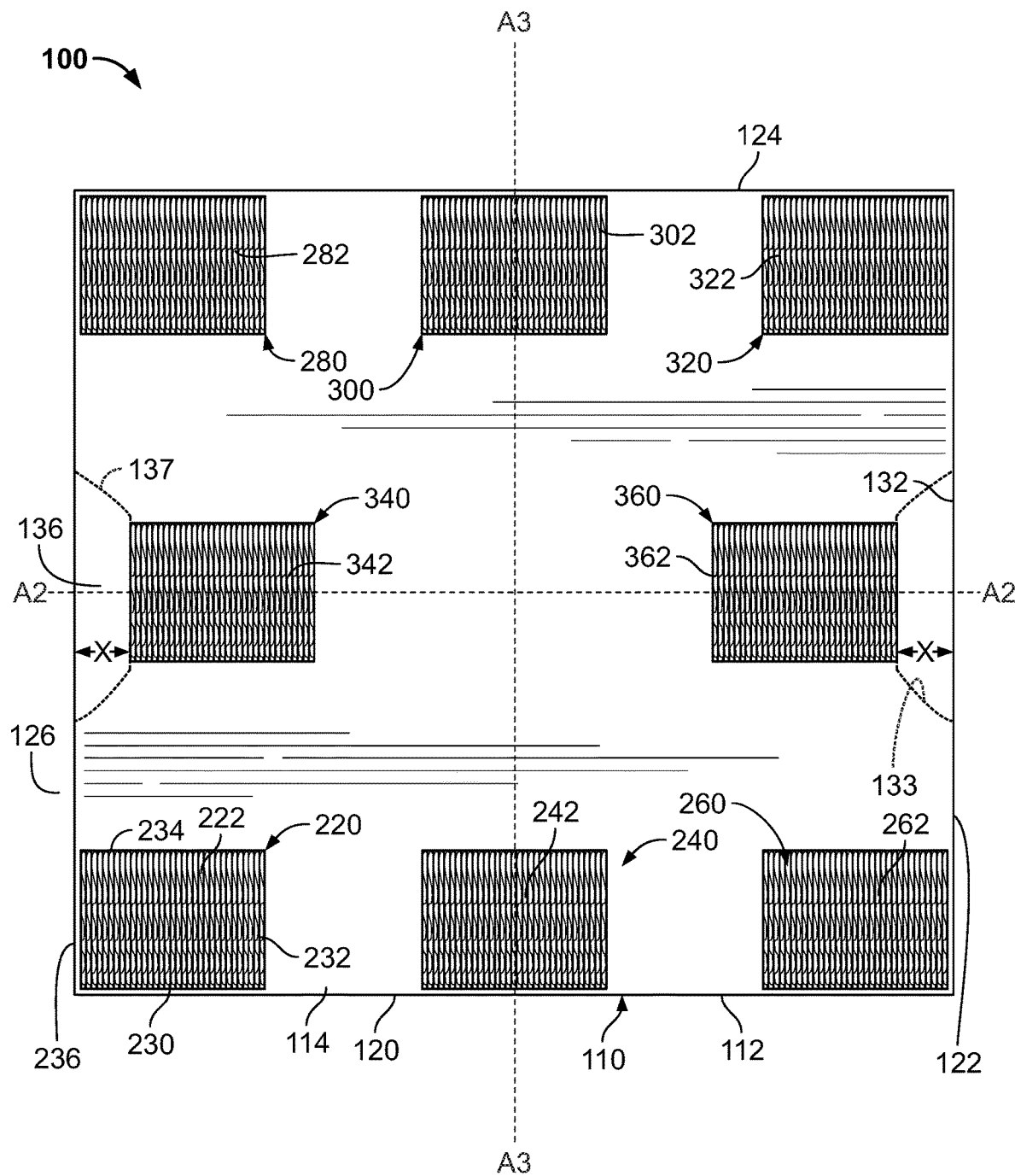
FIG. 8 is top view of the bin riser of FIG. 2 with the second deck removed, and taken substantially through line 8-8 of FIG. 4.
Figure 9:
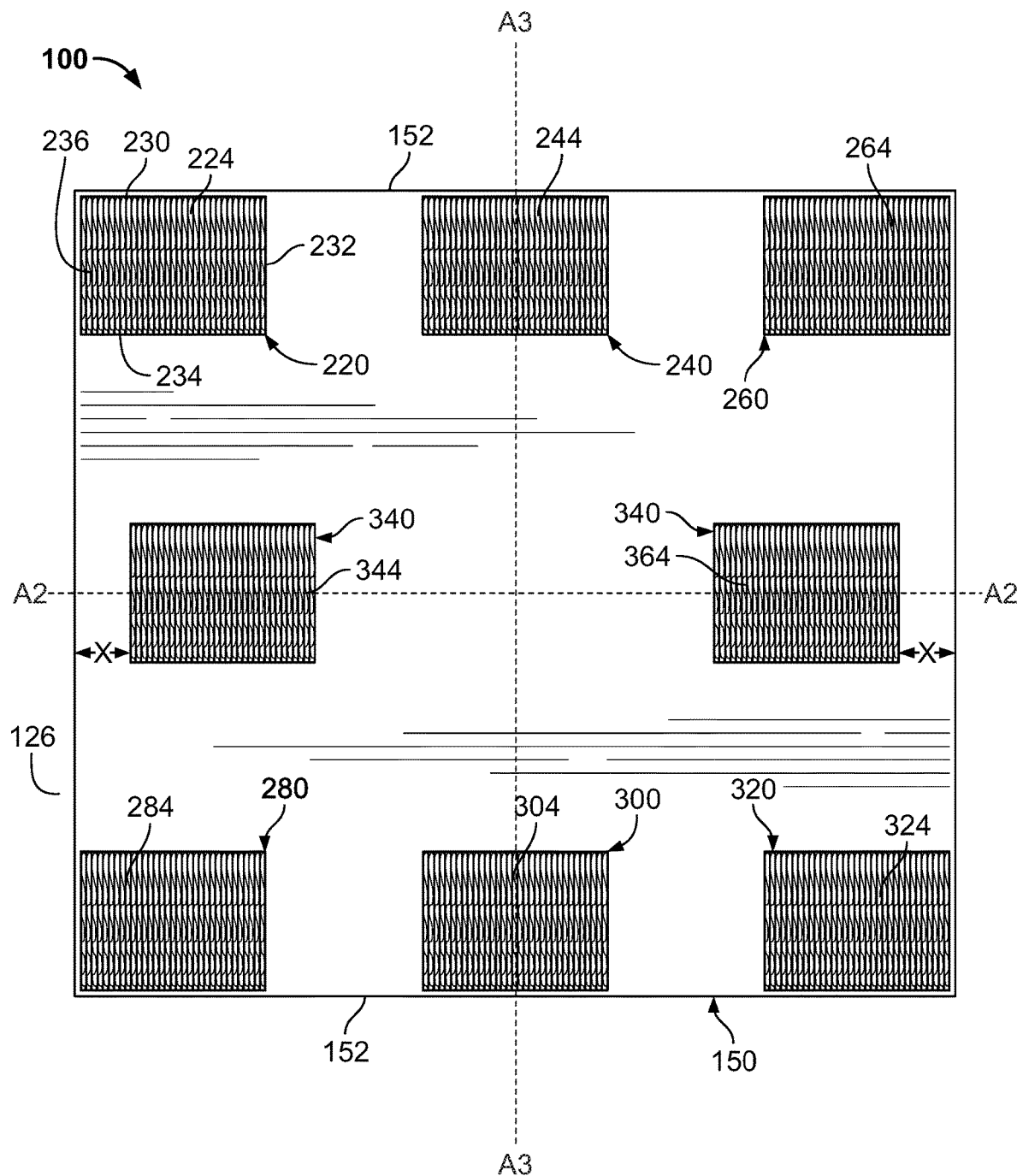
FIG. 9 is bottom view of the bin riser of FIG. 2 with the first deck removed, and taken substantially through line 9-9 of FIG. 4.
Figure 10:
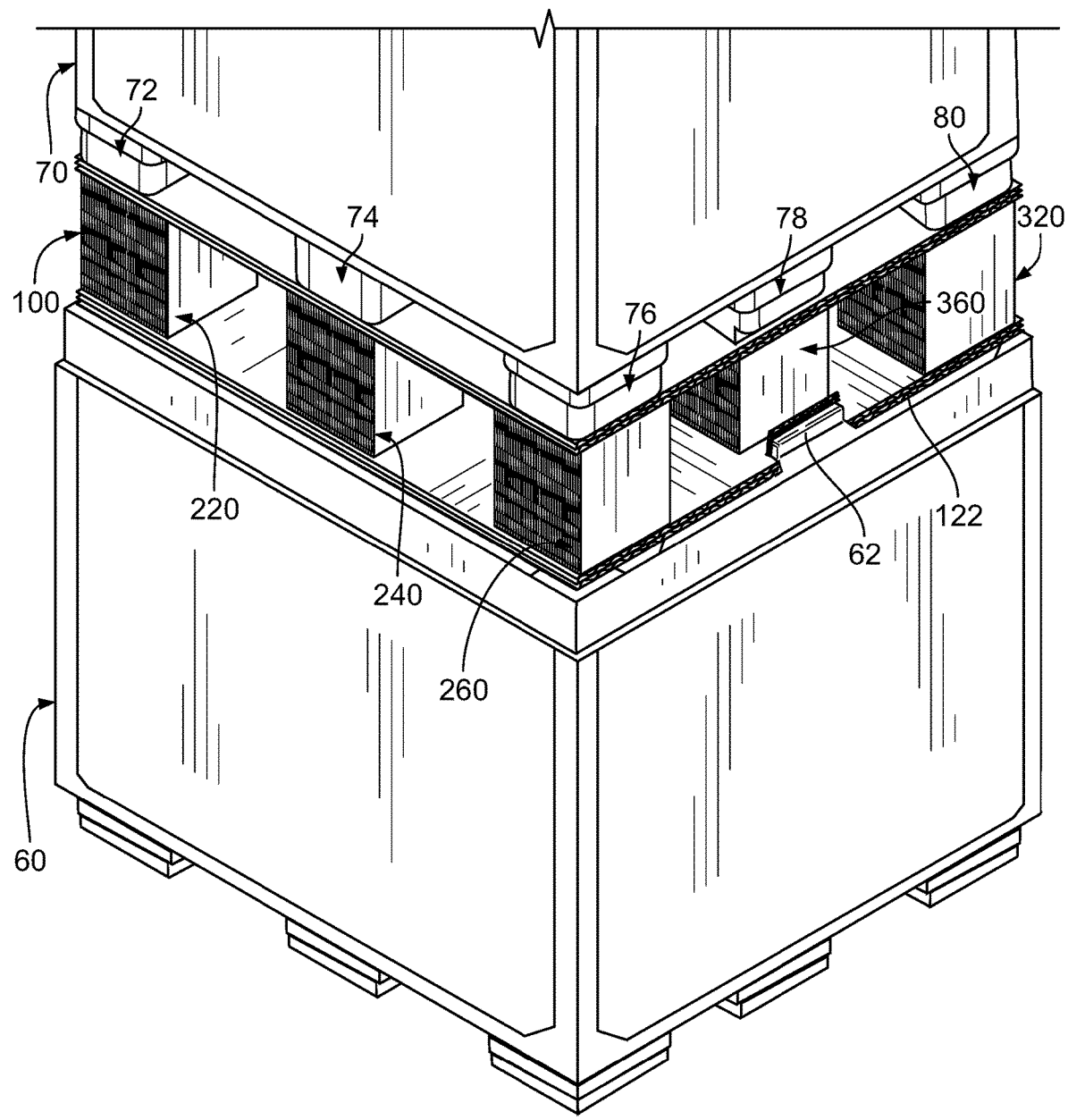
FIG. 10 is a perspective view of the bin riser of FIG. 2 mounted on a first shipping bin and with a second different shipping bin mounted on the bin riser.
Figure 11:
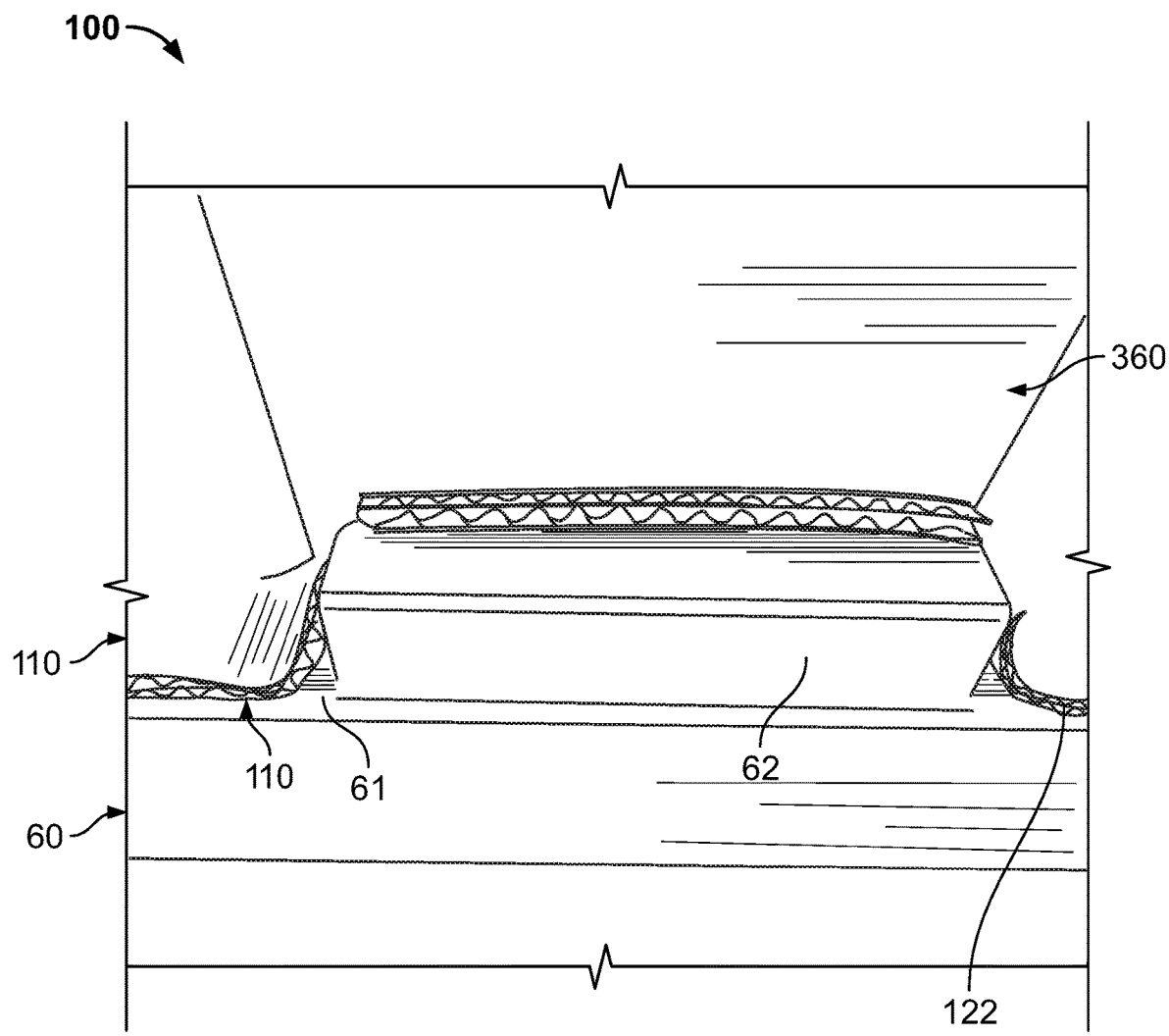
FIG. 11 is an enlarged fragmentary perspective view of the bin riser of FIG. 2 mounted on the first shipping bin (that is also shown in fragmentary) of FIG. 10.
Figure 12:
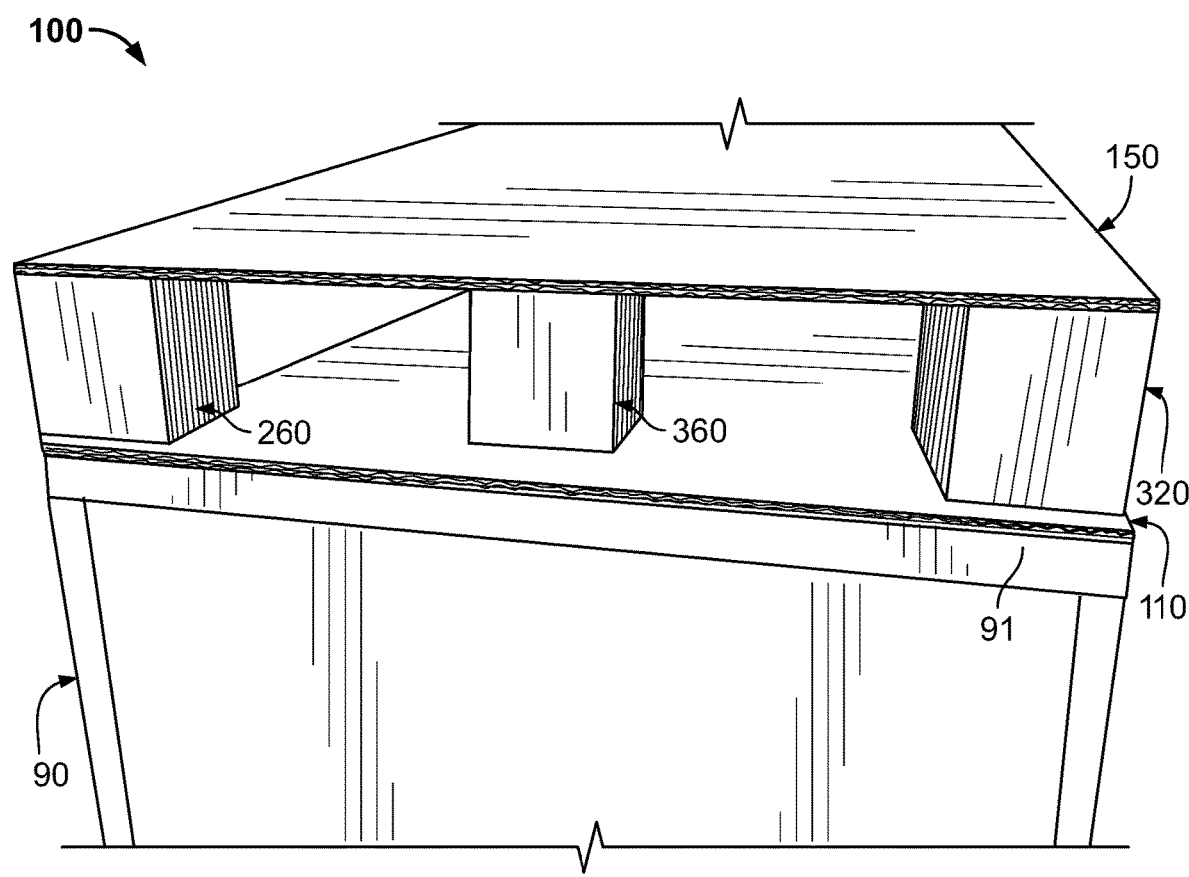
FIG. 12 is a fragmentary perspective view of the bin riser of FIG. 2 mounted on a second different shipping bin (that is also shown in fragmentary).
Figure 13:
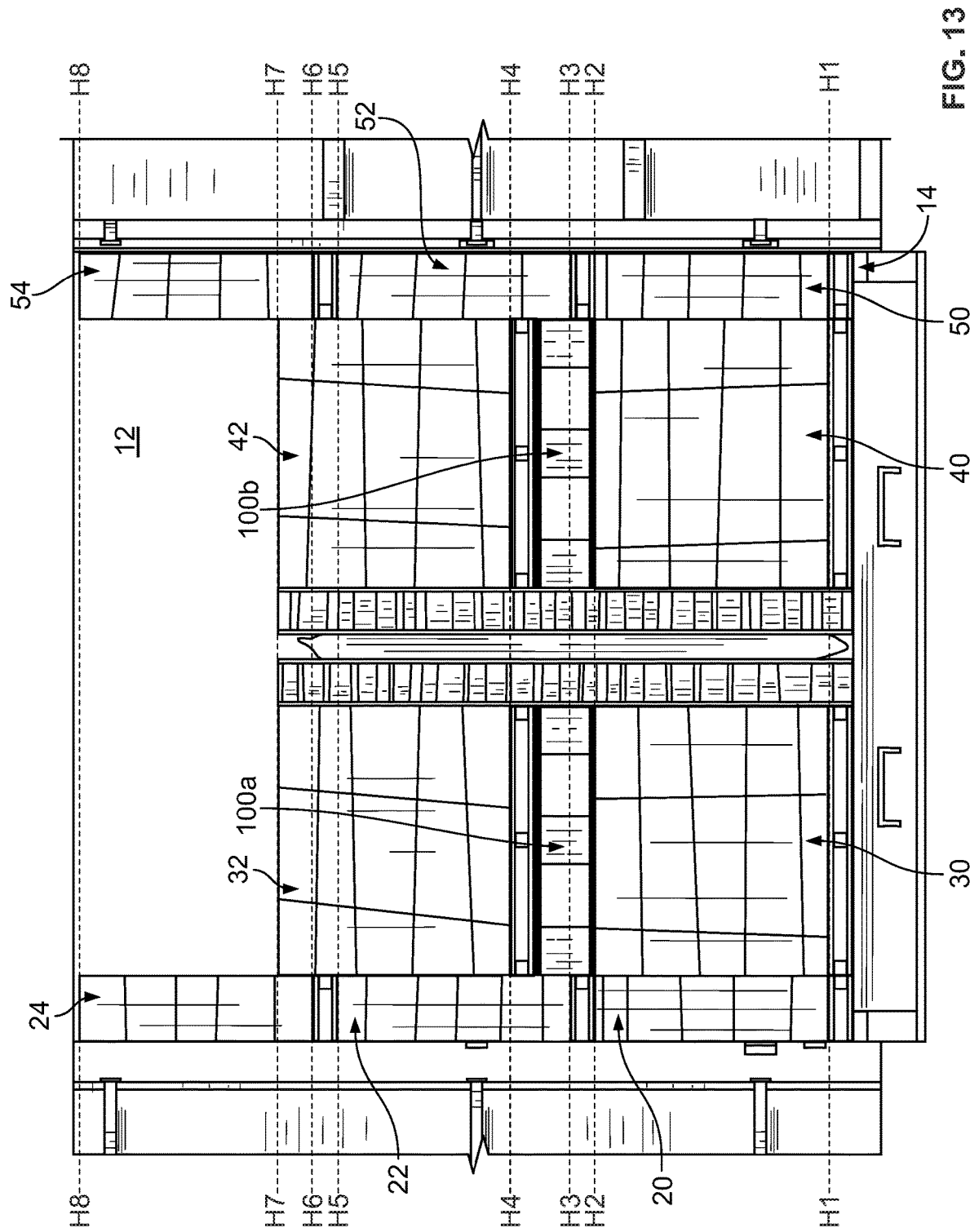
FIG. 13 is a fragmentary side view of a freight railroad car with its side door opened and with four sets of stacked shipping bins positioned in the interior compartment of the freight railroad car and with bin risers of FIG. 2 positioned between the shipping bins of the second and third shipping bin stacks, and with the top ends of the shipping bins of the second and third shipping bin stacks inhibiting the top shipping bins of the respective first and fourth adjacent shipping bin stacks from toppling over.

FIGS. 2 to 13 generally illustrate an example embodiment of a bin riser 100 of the present disclosure. The bin riser 100 is configured to be positioned between two vertically stacked shipping bins such as: (1) between example shipping bins 60 and 70 as generally shown in FIGS. 10 and 11; (2) on example shipping bin 90 as generally shown in FIG. 12; (3) between example shipping bins 30 and 32 as generally shown in FIG. 13; and (4) between example shipping bins 40 and 42 as generally shown in FIG. 13. As best shown in FIGS. 10, 11, and 12, and as further discussed below, the bin riser 100 is configured to rest on top of different types of shipping bins including shipping bins that have upwardly extending stacking guides (such as lid clips). As best shown in FIG. 13, and as further discussed below, the bin riser 100 is configured to be positioned between vertically stacked shipping bins to raise the height of an upper one of the stacked shipping bins relative to the height of an adjacent upper stacked shipping bin to inhibit the adjacent upper stacked shipping bin from toppling over.

More specifically, this illustrated example bin riser 100 includes: (1) a first deck 110; (2) a spaced apart second deck 150; and (3) a spacer assembly 200 extending between and connected to the first deck 110 and the second deck 150. In this illustrated example embodiment, the spacer assembly 200 includes multiple separate individual spaced apart spacers 220, 240, 260, 280, 300, 320, 340, and 360 positioned between the first deck 110 and the second deck 150, and connected to each of the first deck 110 and the second deck 150. The quantity, size, position, and configuration of the spacers of the spacer assembly may vary in accordance with the present disclosure.

In this illustrated example embodiment, the first deck 110 includes a generally planar rectangular panel 112 including a first surface 114, a second surface 116, and four side edges 120, 122, 124, and 126. The first surface 114 and the second surface 116 face in opposing directions. Side edge 120 is opposite side edge 124, and side edge 122 is opposite side edge 126.

The first deck 110 includes a first stacking guide receipt area 132 and a second stacking guide receipt area 136. The first stacking guide receipt area 132 is adjacent to edge 122 and is generally illustrated by phantom line 133. The second stacking guide receipt area 136 is adjacent to edge 126 and is generally illustrated by phantom line 137. The phantom lines 133 and 137 are not meant to exactly define the respective first and second stacking guide receipt areas 132 and 136, but are rather meant to generally indicate these stacking guide receipt areas. The first stacking guide receipt area 132 is configured to partly move upwardly relative to the remainder of the first deck 110 when the second surface 116 of the first deck 110 is placed on a shipping bin with a first upwardly extending stacking guide as further described below with respect to FIGS. 10 and 11. Likewise, the second stacking guide receipt area 136 is configured to partly move upwardly relative to the remainder of the first deck 110 when the first surface 116 of the first deck 110 is placed on a shipping bin with a second upwardly extending stacking guide. In this illustrated example embodiment, the first and second stacking guide receipt areas 132 and 136 of the first deck 110 are each configured to partially separate from the remainder of the first deck 110 (such as by tearing apart) in two spaced apart places when they move upwardly as shown in FIGS. 10 and 11 and as further described below. In various alternative embodiments of the present disclosure, the stacking guide receipt areas each include one or more weakened sections (such as perforations or scores) that are configured to facilitate enabling the stacking guide receipt areas to partly separate from the remainder of the first deck 110 (such as by tearing apart).

In this illustrated example embodiment, the second deck 150 includes a generally planar rectangular panel 152 including a first surface 154, a second surface 156, and four side edges 160, 162, 164, and 166. The first surface 154 and the second surface 156 face in opposite directions. Side edge 160 is opposite side edge 164, and side edge 162 is opposite side edge 166.

Figure 2:
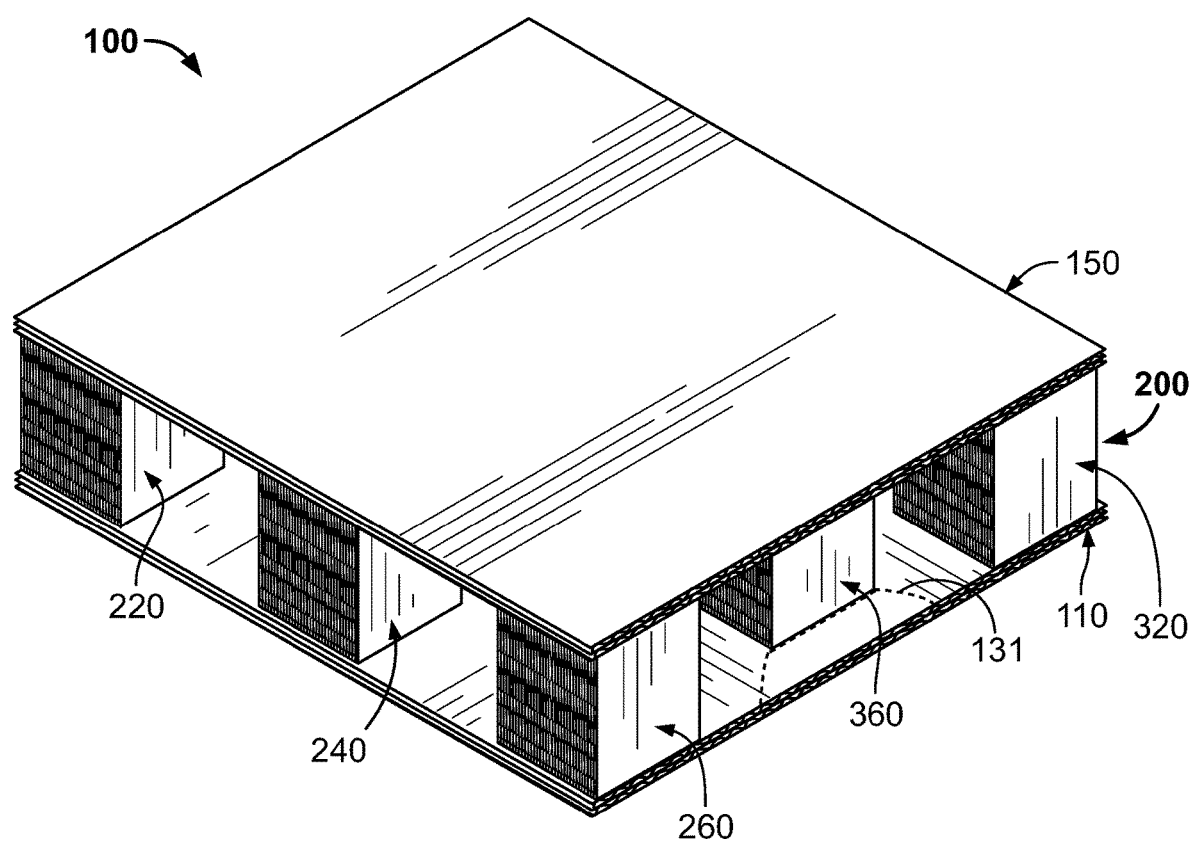
FIG. 2 is a perspective view of a bin riser of an example embodiment of the present disclosure.
Figure 4:
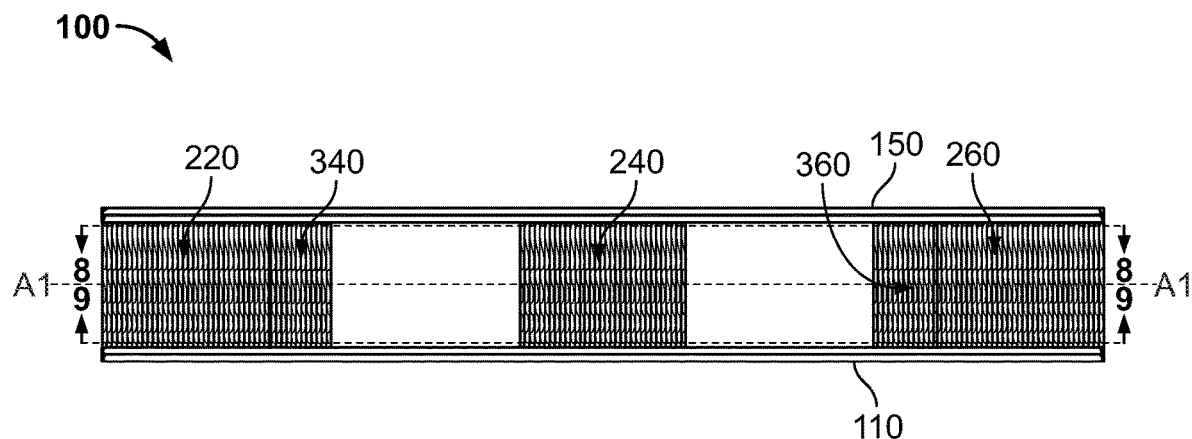
FIG. 4 is a first side view of the bin riser of FIG. 2.
Figure 5:
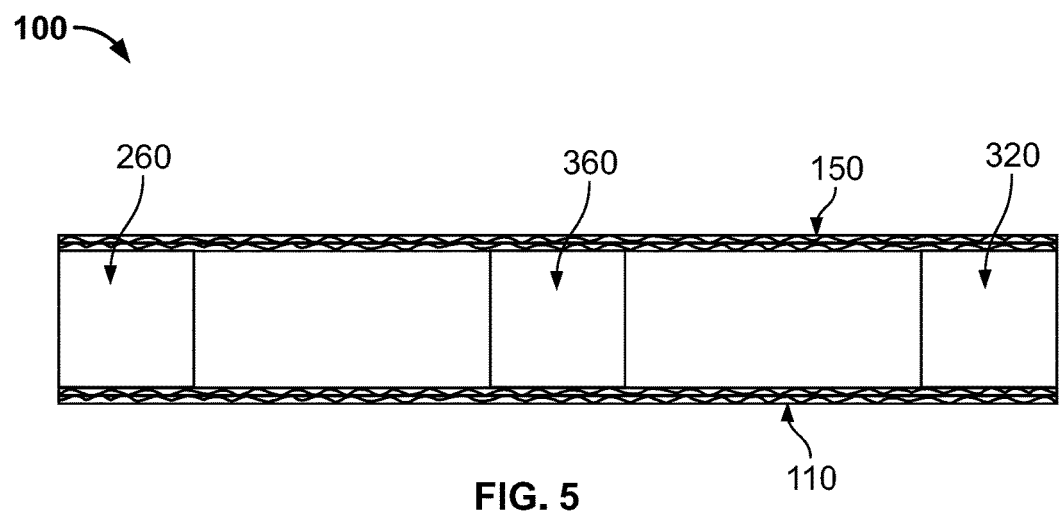
FIG. 5 is a second side view of the bin riser of FIG. 2.
Figure 6:
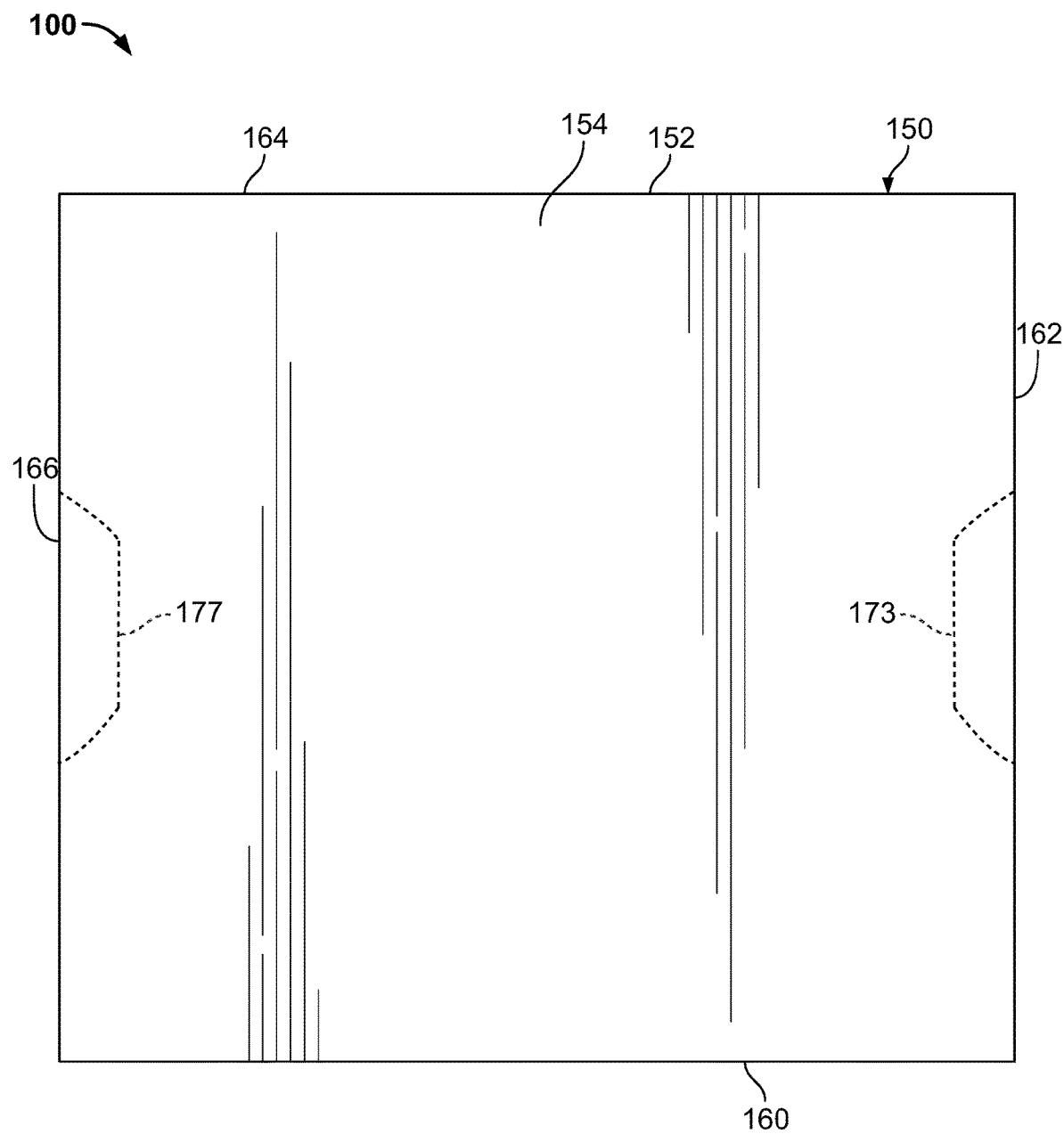
FIG. 6 is a top view of the bin riser of FIG. 2.
Figure 7:
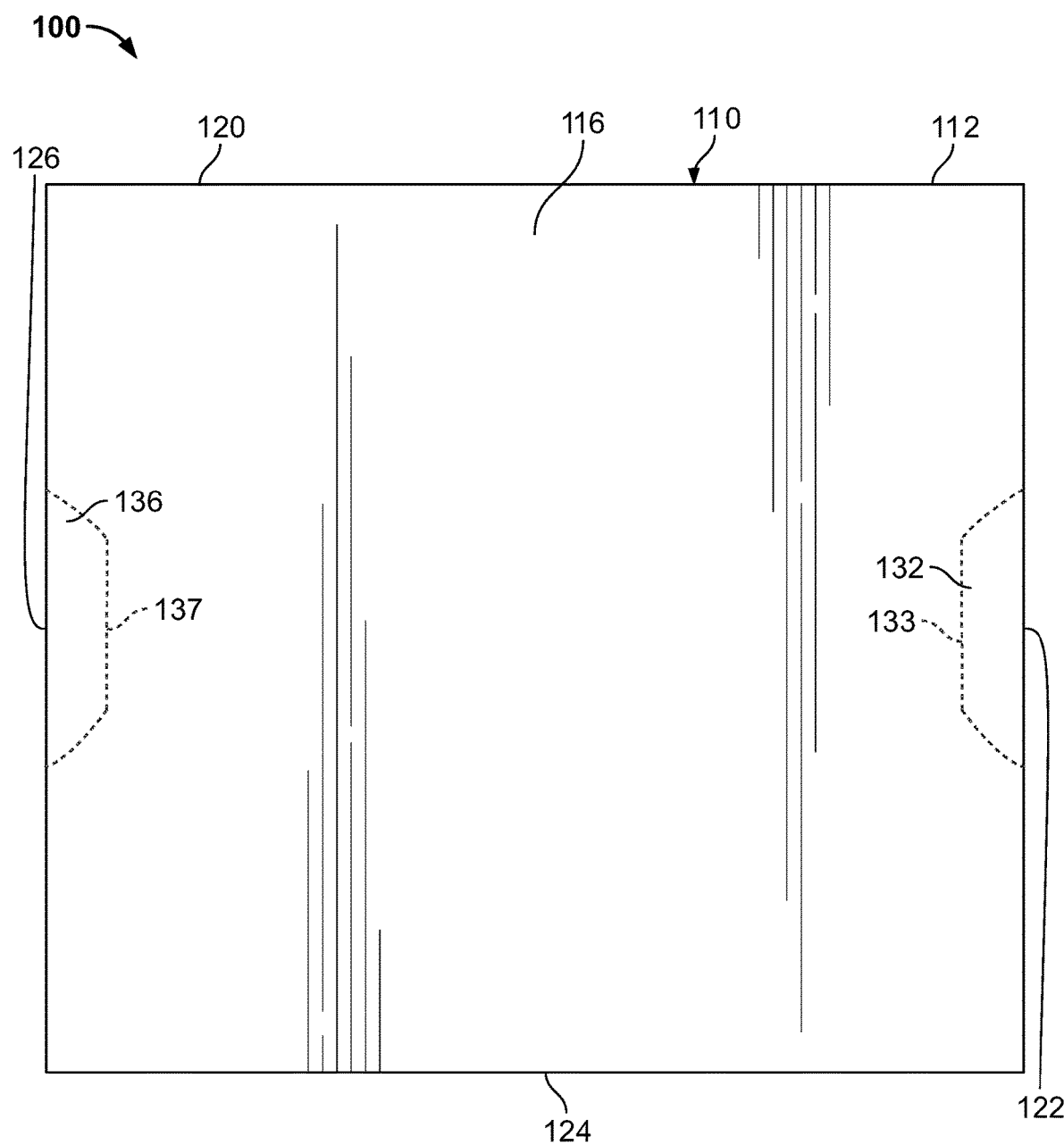
FIG. 7 is a bottom view of the bin riser of FIG. 2.

In this illustrated example embodiment, the second deck 150 is the same shape and size as the first deck 110 such that the four side edges 160, 162, 164, and 166 of the second deck 150 are respectively aligned with the four side edges 120, 122, 124, and 126 as partially shown in FIGS. 2, 4, and 5. In this illustrated example embodiment: (1) the side edges 120 and 124 of the first deck 110 are both approximately 48 inches; (2) the side edges 122 and 126 of the first deck 110 are both approximately 44 inches; (3) the side edges 150 and 154 of the second deck 150 are both approximately 48 inches; and (4) the side edges 152 and 156 of the second deck 150 are both approximately 44 inches. These dimensions may vary in accordance with the present disclosure.

In this illustrated example embodiment: (1) the first surface 114 of the first deck 110 and the first surface 154 of the second deck 150 face in the same direction; (2) the first surface 114 of the first deck 110 and the second surface 156 of the second deck 150 face each in opposite directions and face each other; (3) the second surface 116 of the first deck 110 and the first surface 154 of the second deck 150 face in opposite directions; and (4) the second surface 116 of the first deck 110 and the second surface 156 of the second deck 150 face in the same direction.

In this illustrated example embodiment, each of the first deck 110 and the second deck 110 is made from a generally planar corrugated panel such as a 275 lb. test double wall corrugated panel. The first and second decks can be made from other suitable materials in accordance with the present disclosure such as, but not limited to, a 275 lb. test single wall corrugated panel or a 1,100 lb. test triple wall corrugated panel. In other example alternative embodiments of the present disclosure one or more of the first and second decks can be made from other suitable panels such as honeycomb panel structures. The first and second decks can also be made from different suitable materials in accordance with the present disclosure.

The first and second decks 110 and 150 are spaced apart from each other and connected to each other by the spacer assembly 200. In this illustrated example embodiment, the spacer assembly 200 includes eight individual identical spaced apart spacers 220, 240, 260, 280, 300, 320, 340, and 360. In alternative embodiments of the present disclosure, two or more of the spacers are not identical. Since the spacers 220, 240, 260, 280, 300, 320, 340, and 360 are identical in the illustrated example embodiment, only one spacer (spacer 220) is described in further detail.

Figure 3:
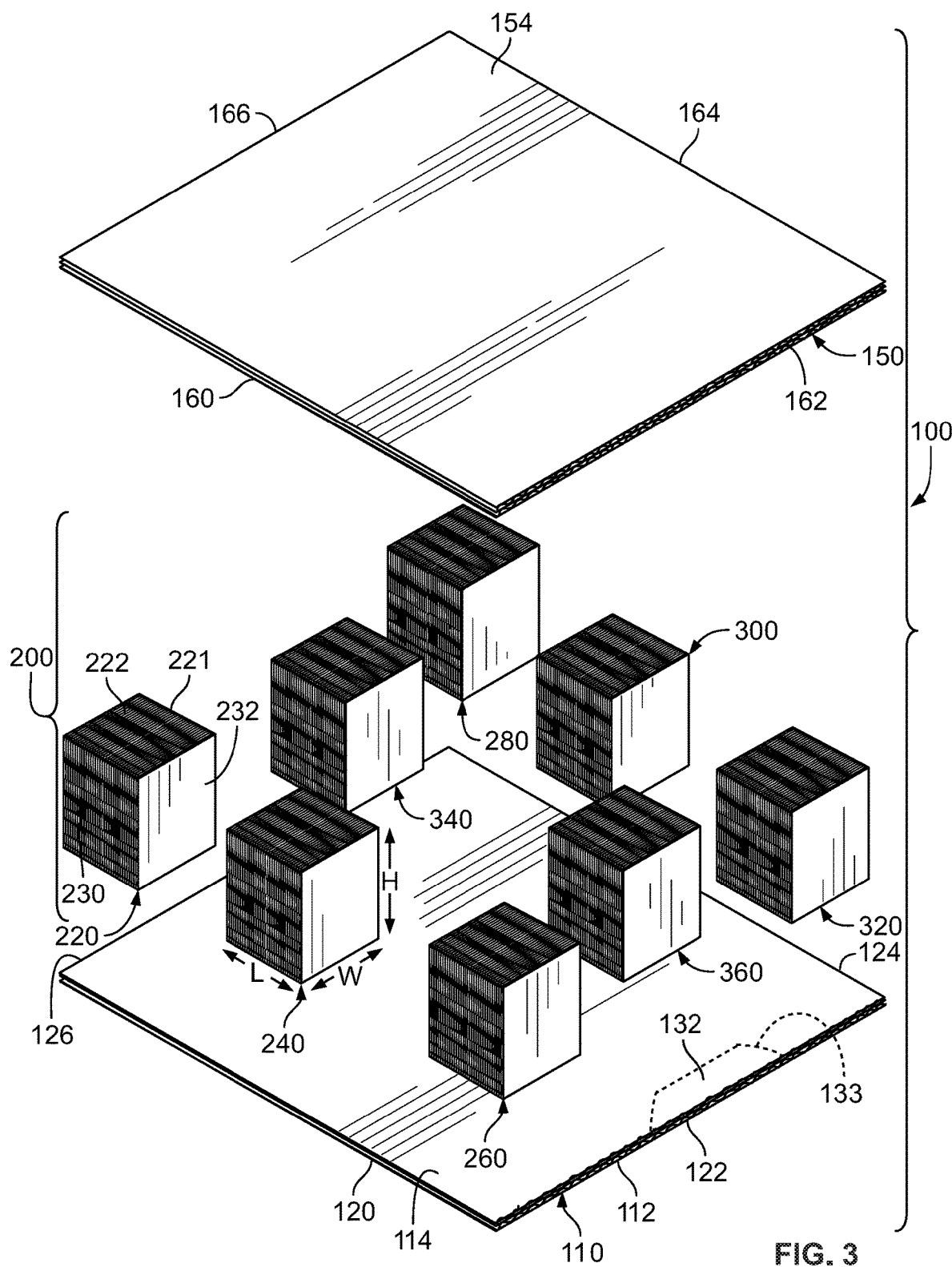
FIG. 3 is an exploded perspective view of the bin riser of FIG. 2.

Spacer 220 includes a generally rectangular cuboid shaped body 221. As best shown in FIGS. 3, 8, and 9, the body 221 includes a first surface 222, a second surface 224, and four side surfaces 230, 232, 234, and 236 each extending between the first surface 222 and the second surface 224. In this illustrated example embodiment: (1) first surface 222 and second surface 224 face in opposite directions; (2) side surface 230 and side surface 234 face in opposite directions; and (3) side surface 232 and side surface 236 face in opposite directions.

As mentioned above, all of the spacers 220, 240, 260, 280, 300, 320, 340, and 360 are identical in the illustrated example embodiment, and thus each of the spacers 220, 240, 260, 280, 300, 320, 340, and 360 are of the same size and have the same dimensions. In this illustrated example embodiment, for example, spacer 240 has a length L of approximately 6 inches, a width W of approximately 6 inches, and a height H of approximately 8 inches (as shown in FIG. 3). Thus, in this illustrated example embodiment: (1) the first surface 222 of spacer 240 is approximately 6 inches by 6 inches; (2) the second surface 224 of spacer 240 is approximately 6 inches by 6 inches; and (3) each of the side surfaces 230, 232, 234, and 236 of spacer 240 are approximately 6 inches by 8 inches. These dimensions may vary in accordance with the present disclosure.

In this illustrated example embodiment: (1) the first surface 222 of spacer 220 is connected to the second surface 156 of the second deck 150 by a suitable adhesive (not shown); and (2) the second surface 224 of spacer 220 is connected to the first surface 114 of the first deck 110 by a suitable adhesive (not shown). Likewise: (1) each of the respective first surfaces 242, 262, 282, 302, 322, 342, and 362 of the spacers 240, 260, 280, 300, 320, 340, and 360 is connected to the second surface 156 of the second deck 150 by a suitable adhesive (not shown); and (2) each of the respective second surfaces 244, 264, 284, 304, 324, 344, and 364 of the spacers 240, 260, 280, 300, 320, 340, and 360 is connected to the first surface 114 of the first deck 110 by a suitable adhesive (not shown). In alternative embodiments of the present disclosure, the spacers are connected to the first deck and the second deck by other suitable connection mechanisms.

The spacers 220, 240, 260, 280, 300, 320, 340 and 360 are positioned between first deck 110 and the second deck 150 such that the bin riser 100 can be employed with any of a plurality of different shipping bins. More specifically: (1) spacers 220, 240, and 260 are positioned adjacent to side edges 120 and 160 of the first and second decks 110 and 150, respectively; (2) spacers 280, 300, and 320 are positioned adjacent to side edges 124 and 164 of the first and second decks 110 and 150, respectively; (3) spacer 360 is positioned inwardly from and spaced from edges 122 and 162 of the first and second decks 110 and 150, respectively; and (4) spacer 340 is positioned inwardly from and spaced from edges 126 and 166 of the first and second decks 110 and 150, respectively.

The spacer 360, by being positioned inwardly from and spaced from edge 122 of the first deck 110, partially defines the first stacking guide receipt area 132. In other words, by being positioned inwardly from edge 122, spacer 360 does not prevent an area of the first deck 110 that defines the first stacking guide receipt area 132 from moving upwardly when it engages a first upwardly extending stacking guide of a shipping bin. In this illustrated example embodiment, the spacer 360 is positioned a distance X (as shown in FIGS. 8 and 9) that is approximately two inches from the side edge 122 of the first deck 110. In various embodiments, the spacer 360 is positioned approximately 2 to 3 inches from the side edge 122 of the first deck 110. These dimensions may vary in accordance with the present disclosure.

Likewise, the spacer 340, by being positioned inwardly from and spaced from edge 126 of the first deck 110, partially defines the second stacking guide receipt area 136. In other words, by being positioned inwardly from edge 126, spacer 340 does not prevent an area of the first deck 110 that defines the second stacking guide receipt area 136 from moving upwardly when it engages a second upwardly extending stacking guide of a shipping bin. In this illustrated example embodiment, the spacer 340 is positioned a distance X (as shown in FIGS. 8 and 9) that is approximately two inches from the side edge 126 of the first deck 110. In various embodiments, the spacer 340 is positioned approximately 2 to 3 inches from the side edge 126 of the first deck 110. These dimensions may vary in accordance with the present disclosure.

In various embodiments, the spacer assembly 200 and particularly spacers 340 and 360 are thus configured to partially define multiple areas of the deck 110 that function as the partially separable stacking guide receipt areas in accordance with the present disclosure.

In this illustrated example embodiment, each of the spacers 220, 240, 260, 280, 300, 320, 340, and 360 is made from multiple adhesively attached individual corrugated panels such as multiple generally planar 275 lb. test double wall corrugated panels. The spacers can be made from other suitable materials in accordance with the present disclosure such as, but not limited to, a 275 lb. test single wall corrugated panels or a 1,100 lb. test triple wall corrugated panels. In other example alternative embodiments of the present disclosure, one or more of the spacers can be made from other suitable panels such as honeycomb panel structures. Two or more of the spacers can also be made from different suitable materials in accordance with the present disclosure.

In this illustrated example embodiment, the bin riser 100 is symmetrical about each of: (1) a first plane including a first central longitudinal axis A1 between the first deck 110 and the second deck 150 of the bin riser 100 as shown in FIG. 4 (i.e., from top to bottom); (2) a second plane including a second central longitudinal axis A2 extending through spacers 340 and 360 as shown in FIGS. 8 and 9 (i.e., from a front side to a back side when facing edges 120 and 160); and (3) a third plane including a third central longitudinal axis A3 extending through spacers 240 and 300 as shown in FIGS. 8 and 9 (i.e., from a right side to a left side when facing edges 120 and 160).

Since the bin riser 100 is symmetrical from top to bottom, the bin riser 100 can be used in multiple different orientations. For example: (1) the first deck 110 can be positioned with the second surface 116 facing downwardly toward and on a top end of a shipping bin; or (2) the second deck 150 can be positioned with the first surface 154 facing downwardly toward and on a top end of a shipping bin. In this second example, the bin riser 100 is turned upside down from the orientation shown in FIGS. 2, 3, 4, and 5. In such case, the second deck 150 includes the first and second partially separable stacking guide receipt areas as generally indicated by phantom lines 173 and 177 in FIG. 6. Thus, the bin riser 100 can be considered reversible from top to bottom. This makes installation and use simpler in that an installer does not need to worry about a correct top to bottom orientation of the bin riser 100 (i.e., either of the decks 110 or 150 can be used as the bottom deck).

Likewise, since the bin riser 100 is symmetrical from a front side to a back side, the bin riser 100 can be used in multiple different orientations. This makes installation and use simpler in that an installer does not need to worry about a correct front to back orientation of the bin riser 100.

Likewise, since the bin riser 100 is symmetrical from a right side to a left side, the bin riser 100 can be used in multiple different orientations. This makes installation and use simpler in that an installer does not need to worry about a correct side to side orientation of the bin riser 100.

FIGS. 10 and 11 illustrate the bin riser 100 of FIGS. 2 to 9 positioned on a first type of shipping bin and specifically on the top end 61 of a plastic shipping bin 60. Shipping bin 60 includes a stacking guide and in particular a lip clip 62 extending upwardly from the top end 61. Although not shown, shipping bin 60 also includes an identical upwardly extending lip clip on the opposite side of the top end 61 of the shipping bin 60. FIGS. 10 and 11 illustrate the first deck 110 of the bin riser 100 positioned on the top end 61 of the shipping bin 60 such that: (1) the stacking guide receipt area 132 is aligned with the lip clip 62; (2) part of the first deck 110 that defines the stacking guide receipt area 132 has moved upwardly; (3) part of the first deck 110 that defines the stacking guide receipt area 132 has torn in two spaced apart locations but remains attached to the rest of the first deck 110; (4) part of the first deck 110 that defines the stacking guide receipt area 132 has moved upwardly adjacent to or in engagement with the spacer 360; and (5) the bin riser 100 sits squarely on the top end 61 of the shipping bin 60. Thus, in this illustrated example embodiment, the second surface 116 of the deck 110 of the bin riser contacts and squarely rests on the top surface of the shipping bin.

FIGS. 10 and 11 also illustrate a second different type of shipping bin and specifically a molded plastic shipping bin 70 positioned on top of the second deck 150 of the bin riser 100. The spacers 220, 240, 260, 280, 300, 320, 340, and 360 are each respectively positioned in the example embodiment of the bin riser to at least partially be aligned with and support one of the legs of the shipping bin 70 (including illustrated legs 72, 74, 76, 78, and 80 of shipping bin 70). The example bin riser 100 described above is configured to be employed with these example molded plastic shipping bins 60 and 70.

The bin riser of the present disclosure can also be alternatively configured to be employed with other molded plastic shipping bins (not shown) that have alternatively configured legs and alternatively configured stacking guides. For example, the alternatively configured shipping bins can include additional upwardly extending stacking guides such as four additional stacking guides adjacent to the upper side edges of the shipping bin (i.e., two additional stacking guides adjacent to each of the opposing upper side edges). For such alternatively configured stacking guides and alternatively configured shipping bins, the bin riser can include spacers spaced away from the side edges of the first and second decks to provide additional stacking guide receipt areas.

FIG. 12 illustrates the bin riser 100 of FIGS. 2 to 9 positioned on a second different type of shipping bin, and particularly an example wood shipping bin 90 that does not have any upwardly extruding stacking guides. FIG. 12 illustrates the first deck 110 of the bin riser 100 positioned on the top end 91 of the shipping bin 60 such that the bin riser 100 sits squarely on the top end 91 of the shipping bin 90.

FIG. 13 illustrates a use of two bin risers 100 of FIGS. 2 to 9 respectively labeled 100a and 100b. FIG. 13 illustrates a freight railroad car 10 having in interior compartment 12 and a side door 14 (shown in an open position). FIG. 13 also illustrates four sets of vertically stacked shipping bins in the freight railroad car 10. These include: (1) stacked shipping bins 20, 22, and 24; (2) stacked shipping bins 30 and 32; (3) stacked shipping bins 40 and 42; and (4) stacked shipping bins 50, 52, and 54. FIG. 13 illustrates the two bin risers 100a and 100b respectively positioned between vertically stacked shipping bins 30 and 32, and positioned between vertically stacked shipping bins 40 and 42.

FIG. 13 illustrates the various heights of the various shipping bins when these two bin risers 100a and 100b of the present disclosure are employed. In this example, all of the heights are measured from the railroad car interior compartment floor. FIG. 13 first illustrates that: (1) the bottom ends of shipping bins 20, 30, 40, and 50 are at a same first height H1; (2) the top ends of shipping bins 20, 30, 40, and 50 are at a same second height H2; (3) the bottom ends of shipping bins 22 and 52 are at a same third height H3; (4) the bottom ends of shipping bins 32 and 42 are raised by the bin risers 100a and 100b and at a same fourth height H4; (5) the top ends of shipping bins 22 and 52 are at a same fifth height H5; (6) the top ends of shipping bins 32 and 42 are raised by the bin risers 100a and 100b and are at a same sixth height H6; (7) the bottom ends of shipping bins 24 and 54 are at a same seventh height H7; and (8) the top ends of shipping bins 24 and 54 are at a same eight height H8. In this illustrated example use of riser bins 100a and 100b: (1) H1<H2; (2) H2<H3; (3) H3<H4; (4) H4<H5; (5) H5<H6; (6) H6<H7; and (8) H7<H8.

The top end of shipping bin 32 is above the height H6 of the bottom end of shipping bin 24 and prevents shipping bin 24 from toppling over. In this illustrated example embodiment, the bin riser 100a raises the shipping bin 32 approximately 8 to 10 inches (which is approximately equal to the combined heights of the spacers and the first and second decks of the bin riser 100a). These dimensions may vary in accordance with the present disclosure.

Likewise, the top end of shipping bin 42 is above the height H6 of the bottom end of shipping bin 52 and prevents shipping bin 52 from toppling over. In this illustrated example embodiment, the bin riser 100b raises the shipping bin 42 approximately 8 to 10 inches (which is approximately equal to the combined heights of the spacers and the first and second decks of the bin riser 100*b*).

Thus, when the side door 14 is opened, shipping bins 24 and 54 are substantially less likely to have moved in transit, and shipping bins 24 and 54 are substantially less likely to topple over onto shipping bins 32 and 42, and substantially less likely to fall out of the railroad car 10 onto the opened side door 14.

By employing the bin riser 100 of the present disclosure, additional shipping bins can be stably stacked in such containers. In certain freight railroad cars, two high shipping bin stacks have been typically employed to avoid product loss from toppling shipping bins. The bin riser 100 enables many three high shipping bin stacks to be employed. This substantially increases the payload of these freight railroad cars without increasing product loss. For example, for a conventional fifty foot six inch boxcar, the bin risers of the present disclosure facilitate an increase from 52 shipping bins to 72 shipping bins while still being within maximum weight limits for this freight railroad car. This provides substantial fuel, time, and shipping expense savings.

The present disclosure thus provides a method of stacking shipping bins. The method includes positioning a first shipping bin at one or more designated locations in a container (such as adjacent to the doorway of a container), wherein the top end of the first shipping container includes an upwardly extending stacking guide. The method further includes positioning a bin riser on the top end of the first shipping bin such that part of a stacking guide receipt area of a first deck of the bin riser engages the upwardly extending stacking guide of the first shipping bin and partially deforms. The method further includes positioning a second shipping bin on a second deck of the bin riser. In various embodiments, the positioning of the bin riser on the top end of the first shipping bin such that part of a stacking guide receipt area of the first deck of the bin riser engages the upwardly extending stacking guide of the first shipping bin causes the stacking guide receipt area to partially separate from the first deck of the bin riser.

Figure 14:
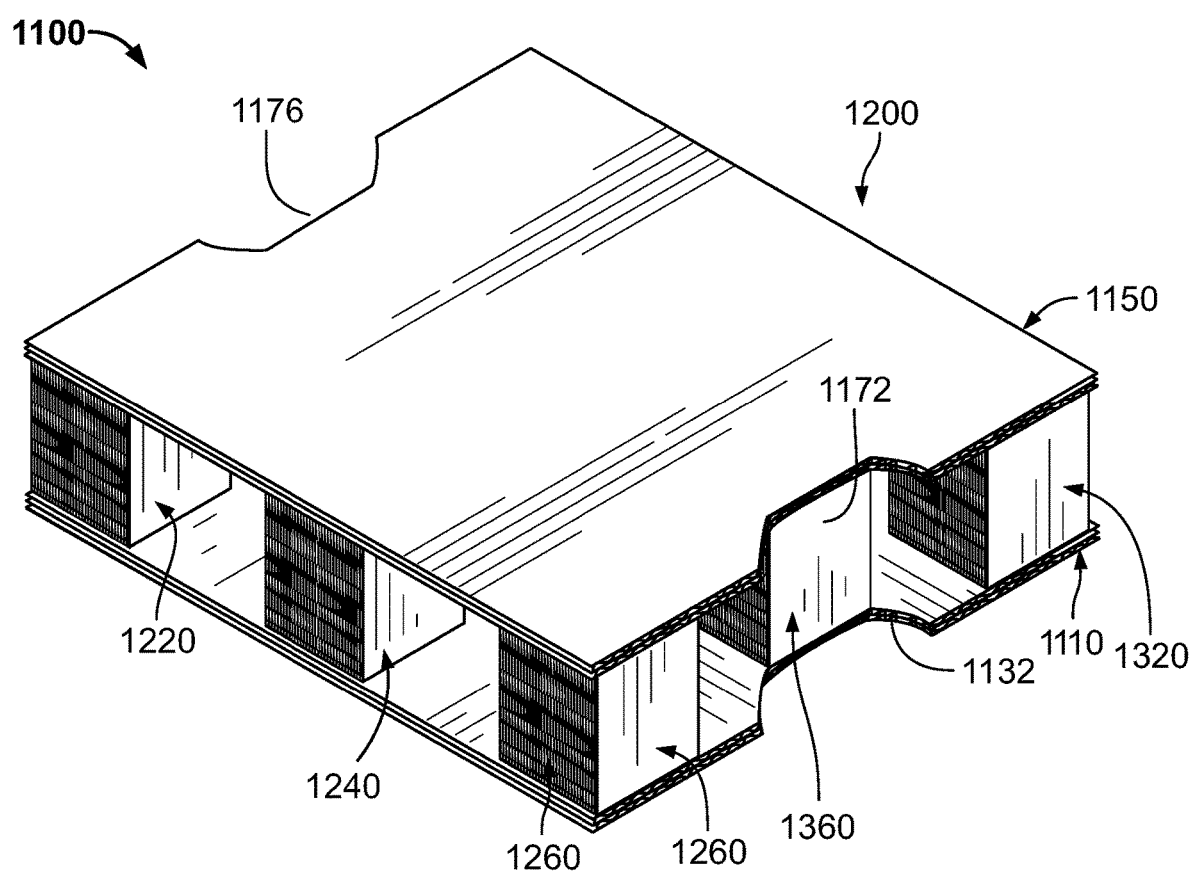
FIG. 14 is a perspective view of a bin riser of another example embodiment of the present disclosure.

FIG. 14 generally illustrates another example embodiment of a bin riser 1100 of the present disclosure. Like bin riser 100, bin riser 1100 is configured to be positioned between two vertically stacked shipping bins. The bin riser 1100 is configured to rest on top of different types of shipping bins including shipping bins that have upwardly extending stacking guides (such as lid clips). The bin riser 1100 is also configured to be positioned between vertically stacked shipping bins to raise the height of an upper one of the stacked shipping bins relative to the height of an adjacent upper stacked shipping bin to inhibit the adjacent upper stacked shipping bin from toppling over.

Like bin riser 100, this illustrated example bin riser 1100 includes: (1) a first deck 1110; (2) a spaced apart second deck 1150; and (3) a spacer assembly 1200 extending between and connected to the first deck 1110 and the second deck 1150. In this illustrated example embodiment, the spacer assembly 1200 includes the same spacer assembly as bin riser 100 including shown separate individual spaced apart spacers 1220, 1240, 1260, 1320, and 1360 positioned between the first deck 1110 and the second deck 1150, and connected to each of the first deck 1110 and the second deck 1150. The quantity, size, position, and configuration of the spacers of the spacer assembly may vary in accordance with the present disclosure.

In this illustrated example embodiment, the first deck 1110 and the second deck 1150 are similar to the first deck 110 and 150 except that the stacking guide receipt areas are different. In this illustrated example embodiment, the first deck 1110 defines two opposing stacking guide receipt areas 1132 and 1136 (not shown) and the second deck 1150 defines two opposing stacking guide receipt areas 1172 and 1176. In this illustrated example embodiment, for each stacking guide receipt area of each deck, instead of the deck having an area configured to be partially separated from the rest of that deck when positioned on a shipping bin with an upwardly extending stacking guide as with bin riser 100, the area that defines the stacking guide receipt area has been removed from the deck to form the stacking guide receipt area. In this manner, this alternative example bin riser 1100 can squarely rest on shipping bins with upwardly extending stacking guides as well as shipping bins without such upwardly extending stacking guides.

In other example embodiments the bin riser of the present disclosure, two or more of the spacers are integrally formed and are thus not individual members.

In other example embodiments the bin riser of the present disclosure, two or more of the spacers and one or more of the decks are integrally formed and are thus not individual members. In certain such alternative embodiments, the entire bin riser is made from a honeycomb structure that is formed with the respective stacking guide receipt areas.

In other example embodiments the bin riser of the present disclosure, the bin riser includes more than two decks and a spacer assembly between each pair of decks.

Thus, in various embodiments of the present disclosure, the bin riser includes a first deck; a second deck; and a spacer assembly connected to and extending between the first and second decks, the spacer assembly comprising a first spacer spaced apart from a first side edge of the first deck and partially defining a first stacking guide receipt area of the first deck, and a second spacer spaced apart from a second side edge of the first deck and partially defining a second stacking guide receipt area of the first deck.

In various such embodiments of the bin riser, the first deck is configured to enable the first stacking guide receipt area to be partially separated from the first deck, and wherein the second deck is configured to enable the second stacking guide receipt area to be partially separated from the first deck.

In various such embodiments of the bin riser, the first deck includes a first weakened area that at least partially defines the first stacking guide receipt area, and wherein the second deck includes a second weakened area that at least partially defines the second stacking guide receipt area.

In various such embodiments of the bin riser, the first and second weakened areas comprise perforations.

In various such embodiments of the bin riser, the first spacer is spaced apart from a first side edge of the second deck and partially defines a first stacking guide receipt area of the second deck, and the second spacer is spaced apart from a second side edge of the second deck and partially defines a second stacking guide receipt area of the second deck.

In various such embodiments of the bin riser, the first deck is the same shape and size as the second deck.

In various such embodiments of the bin riser, the bin riser is symmetrical about a first plane including a first central longitudinal axis between the first deck and the second deck.

In various such embodiments of the bin riser, the bin riser is symmetrical about a second plane including a second different central longitudinal axis between the first deck and the second deck.

In various such embodiments of the bin riser, the bin riser is symmetrical about a third plane including a third different central longitudinal axis between the first deck and the second deck.

In various such embodiments of the bin riser, the spacer assembly comprises a plurality of individual spacers.

In various such embodiments of the bin riser, each spacer is adhesively connected to the first deck and the second deck.

In various such embodiments of the bin riser, a plurality of the spacers are each positioned closer to a third side edge of the first deck than the first spacer is positioned to the first side edge of the first deck.

In various such embodiments of the bin riser, a plurality of the spacers are positioned closer to a fourth side edge of the first deck than the first spacer is positioned to the first side edge of the first deck.

In various such embodiments of the bin riser, the bin riser is symmetrical about a first plane including a first central longitudinal axis between the first deck and the second deck, which is symmetrical about a second plane including a second different central longitudinal axis between the first deck and the second deck, which is symmetrical about a third plane including a third different central longitudinal axis between the first deck and the second deck, wherein the first deck is the same shape and size as the second deck, wherein the first deck includes a first weakened area that at least partially defines the first stacking guide receipt area, wherein the first deck is configured to enable the first stacking guide receipt area to be partially separated from the first deck, wherein the second deck includes a second weakened area that at least partially defines the second stacking guide receipt area, and wherein the second deck is configured to enable the second stacking guide receipt area to be partially separated from the first deck.

In various such embodiments of the bin riser, the first deck and the second deck comprises a corrugated panel, and each spacer comprises multiple attached corrugated panels.

Various other embodiments of the present disclosure provide a method of stacking shipping bins that comprises: positioning a first shipping bin at a designated location, a top end of the first shipping container including an upwardly extending stacking guide; positioning a bin riser on the top end of the first shipping bin such that part of a stacking guide receipt area of a first deck of the bin riser engages the upwardly extending stacking guide of the first shipping bin and partially deforms; and positioning a second shipping bin on a second deck of the bin riser.

Various such embodiments of the method includes positioning of the bin riser on the top end of the first shipping bin such that part of a stacking guide receipt area of the first deck of the bin riser engages the upwardly extending stacking guide of the first shipping bin causes the stacking guide receipt area to partially separates from the first deck of the bin riser.

Various changes and modifications to the presently preferred embodiments described herein will be apparent to those skilled in the art. These changes and modifications can be made without departing from the spirit and scope of the present subject matter and without diminishing its intended advantages. It is intended that such changes and modifications be covered by the appended claims.

The invention claimed is:

1. A method of loading a shipping container, the method comprising:
    positioning a first shipping bin on a floor of a shipping container;
    positioning a second shipping bin atop the first shipping bin;
    positioning a third shipping bin atop the second shipping bin;
    positioning a fourth shipping bin on the floor of the shipping container adjacent to the first shipping bin;
    positioning a bin riser atop the fourth shipping bin, the bin riser comprising first and second decks and one or more spacers separating the first and second decks, wherein the first deck is formed from a deformable material; and
    positioning a fifth shipping bin atop the bin riser,
    wherein at least one of positioning the bin riser atop the fourth shipping bin and positioning the fifth shipping bin atop the bin riser causes the first deck of the bin riser to partially deform,
    wherein the bin riser and the shipping bins are sized such that a top end of the second shipping bin is a first height above the floor of the shipping container and a top end of the fifth shipping bin is a second height above the floor of the shipping container, wherein the second height is greater than the first height.

2. The method of claim 1, wherein the first, second, third, fourth, and fifth shipping bins are identical in height.

3. The method of claim 1, wherein the bin riser and the shipping bins are sized such that a bottom end of the third shipping bin is a third height above the floor of the shipping container, wherein the second height is greater than the third height.

4. The method of claim 3, wherein the first deck is formed from a corrugated panel.

5. The method of claim 1, wherein the first deck is formed from a corrugated panel.

6. The method of claim 1, wherein the fourth shipping bin includes an upwardly extending stacking guide that engages and causes the first deck to partially deform during one of positioning the bin riser atop the fourth shipping bin and positioning the fifth shipping bin atop the bin riser.

7. The method of claim 6, wherein the first deck is formed from a corrugated panel, wherein the bin riser and the shipping bins are sized such that a bottom end of the third shipping bin is a third height above the floor of the shipping container, wherein the second height is greater than the third height.

8. The method of claim 1, wherein the at least one of positioning the bin riser atop the fourth shipping bin and positioning the fifth shipping bin atop the bin riser causes the first deck of the bin riser to partially deform by causing a stacking-guide-receipt area of the first deck to partially separate from the remainder of the first deck.

9. The method of claim 8, wherein perforations defined in the first deck at least partially define the stacking-guide-receipt area of the first deck.

10. The method of claim 8, wherein one or more spacers comprise a first spacer, a second spacer spaced-apart from the first spacer, and a third spacer between the first and second spacers, wherein the third spacer is spaced-apart from a first edge of the first deck, wherein the first and second spacers are closer to the first edge than the third spacer, wherein the stacking-guide-receipt area is between the first, second, and third spacers.

11. The method of claim 10, wherein the first and second spacers are adjacent the first edge of the first deck.

12. The method of claim 1, further comprising positioning the fourth shipping bin adjacent a doorway of the shipping container.

13. The method of claim 1, wherein the bin riser is a first bin riser, the method further comprising:

positioning a sixth shipping bin on the floor of the shipping container;

positioning a seventh shipping bin atop the sixth shipping bin;

positioning an eighth shipping bin atop the seventh shipping bin;

positioning a ninth shipping bin on the floor of the shipping container adjacent to the sixth shipping bin;

positioning a second bin riser atop the ninth shipping bin, the second bin riser comprising first and second decks and one or more spacers separating the first and second decks, wherein the first deck is formed from a deformable material; and positioning a tenth shipping bin atop the bin riser, wherein at least one of positioning the second bin riser atop the ninth shipping bin and positioning the tenth shipping bin atop the second bin riser causes the first deck of the second bin riser to partially deform, wherein the second bin riser and the shipping bins are sized such that a top end of the seventh shipping bin is a third height above the floor of the shipping container and a top end of the tenth shipping bin is a fourth height above the floor of the shipping container, wherein the fourth height is greater than the third height.

14. The method of claim 13, further comprising positioning the shipping bins such that the fourth and ninth shipping bins separate the first and sixth shipping bins.

15. The method of claim 14, further comprising positioning the shipping bins such that the fourth and ninth shipping bins are adjacent to one another, the first and second bin risers are adjacent to one another, and the fifth and tenth shipping bins are adjacent to one another.

16. The method of claim 15, further comprising positioning the fourth and ninth shipping bins adjacent a doorway of the shipping container.

17. The method of claim 16, wherein the fourth and ninth shipping bins span at least a majority of the doorway.

18. The method of claim 17, wherein the bin risers and the shipping bins are sized such that:
  a bottom end of the third shipping bin is a fifth height above the floor of the shipping container, wherein the second height is greater than the fifth height; and
  a bottom end of the seventh shipping bin is a sixth height above the floor of the shipping container, wherein the fourth height is greater than the sixth height.

19. The method of claim 18, wherein the first shipping container directly contacts the fourth shipping container, wherein the second shipping container directly contacts the fifth shipping container, wherein the sixth shipping container directly contacts the ninth shipping container, wherein the seventh shipping container directly contacts the tenth shipping container.

20. The method of claim 19, wherein the fourth shipping container does not directly contact the ninth shipping container, wherein the fifth shipping container does not directly contact the tenth shipping container.

* * * * *